Oct. 9, 1945. M. WATTER 2,386,522
AIRFOIL CONSTRUCTION
Filed May 25, 1943
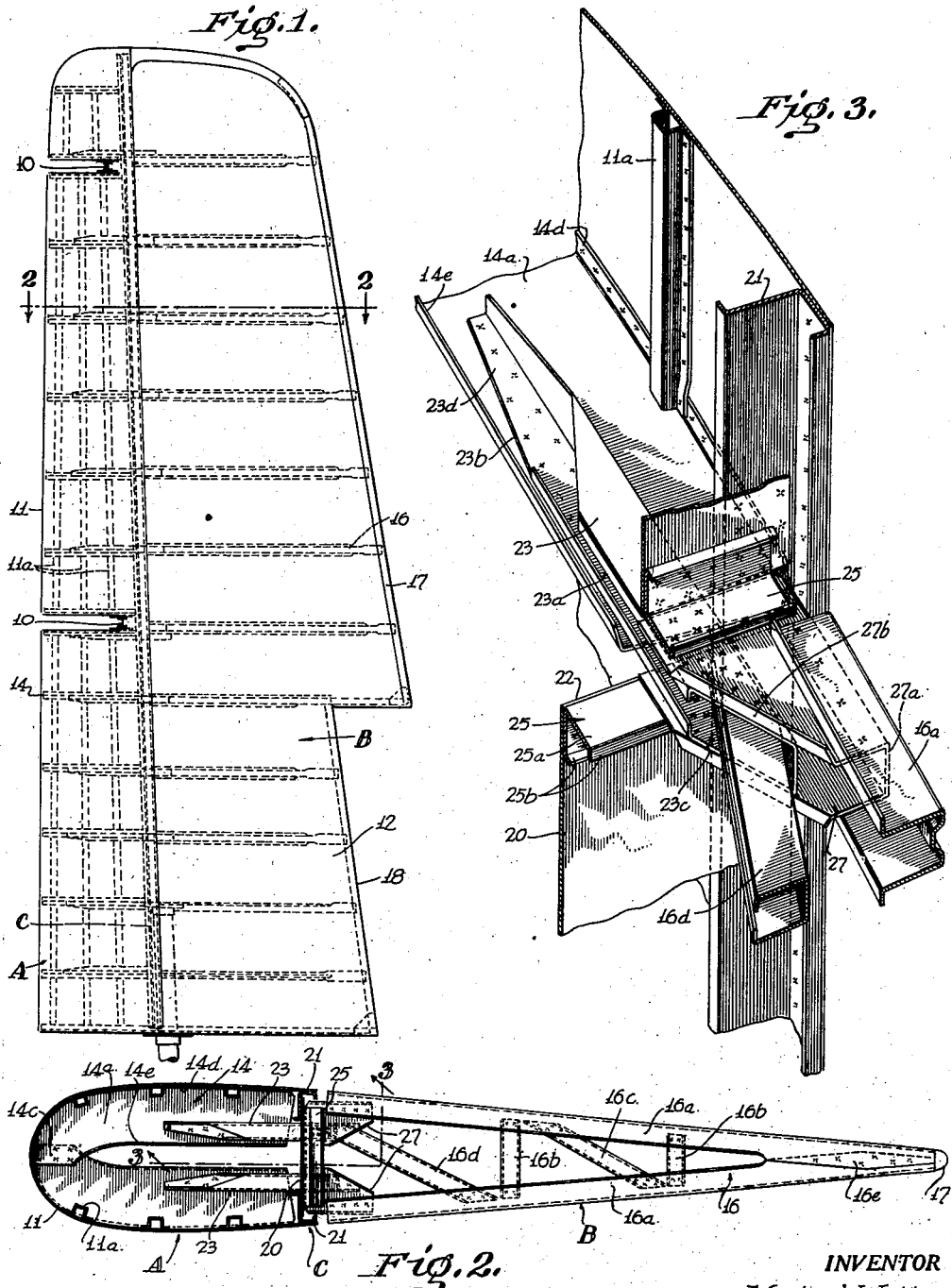
INVENTOR
Michael Watter.
BY John P. Tarbox
ATTORNEY Patented Oct. 9, 1945

2,386,522

UNITED STATES PATENT OFFICE 2,386,522

AIRFOIL CONSTRUCTION

Michael Watter, Philadelphia, Pa., assignor to Edward G. Budd Manufacturing Company, Philadelphia, Pa., a corporation of Pennsylvania Application May 25, 1943, Serial No. 488,329

8 Claims. (Cl. 244—123)

This invention relates to metal frame structures particularly adapted for airfoils and the like, and has for an object the provision of improvements in this art. The present invention is an improvement upon that disclosed in copending application, Serial No. 473,808, filed January 28, 1943.

In the construction of airfoils a primary consideration is to provide maximum strength with minimum weight. When such structures are formed of sheet metal a further consideration is to keep the gauge as light as possible and to so design the parts that great strength is nevertheless provided. When the parts are connected by welding, as preferred in the present instance, the welding operations are greatly facilitated by using light gauge metal. The proposed structure expedites assembly, particularly by electric welding, and provides a very strong frame. The primary aim of the present invention is to so arrange the various parts of the structure and to connect the same in such manner that shear loads at the connections of relatively thin gauge metal parts, such as the connection between a metallic nose covering and the spar member of an airfoil are minimized.

Although the invention may have varied applications it will be described in connection with an airplane rudder but it is equally applicable to other movable airfoils and to fixed airfoils as well. The invention relates more specifically to the type of airfoil which embodies a nose or leading section and a trailing section connected by a spar and associated parts.

In the accompanying drawing which illustrates one form of the invention:

Fig. 1 is a side elevation of an airplane rudder embodying the invention;

Fig. 2 is an enlarged chordwise section taken on the line 2—2 of Fig. 1; and

Fig. 3 is an enlarged partial interior view showing the details of a joint on one side of the spar, the view being taken approximately on the line 3—3 of Fig. 2.

While the invention is not limited to aircraft, it finds special usefulness in this field, particularly as applied to electric spot welded sheet metal frame structures for airplane airfoils, and hence will be described in this connection, specifically in connection with a tail rudder.

The rudder illustrated comprises a nose or leading section A, a trailing section B, and a connecting spar C. The rudder moves about the hinge elements 10. The nose section may be covered with a sheet metal skin 11 and the trailing section with a fabric skin 12. The fabric is applied to the trailing section after the metal framework therefor has been completed and assembled with the related framework, hence good access is provided from the rear and between the trailing sections. The nose section may be covered when formed. It is to be understood, however, that the trailing section also may be covered with a thin metallic skin.

The nose section A comprises plate-like ribs 14 divided at the center, the bipartite elements 14a standing apart from the rear end for most of their length and being welded together at their front end through their overlapping extensions 14c. The rib elements are provided with outer marginal flanges 14d to which the skin 11 is welded and the flanges thereof extend in opposite directions. Suitable flanged channel stringers 11a are welded to the skin to strengthen and stiffen it intermediate the ribs 14. The rib elements are strengthened interiorly by oppositely directed flanges 14e.

The trailing section B, in addition to the skin 12 already noted, comprises a plurality of truss ribs 16 each including chords 16a, vertical struts 16b, and inclined struts 16c, 16d, strut 16d being the one adjacent the spar or leading end of the rib. The chords 16a are welded together through overlapping extensions 16e at their trailing ends. The rear ends of the trailing section ribs 16 are connected together by a trailing edge strip 17 except at the trim tab recess and here a rear bulkhead 18 serves the purpose.

The spar C comprises a web 20 and L- or Z-shaped chords 21 welded to each edge. The web 20 is formed as a substantially continuous plate except where openings are purposefully made in it. Two such openings 22 (or a single long opening, as shown) are provided in the plane of each rib, each opening being bottomed at the inner edge of a chord 21. Through each opening 22 in final assembly there is disposed a box-like shear transfer member 23 which is open at 23a on the inner side for access of welding tongs and the like and cut back from the ends at 23b (front) and 23C (rear) for the same purpose. Before final assembly the members 23 are welded through one side as at 23d to the nose rib elements 14a outside their inner flanges. In making the final assembly the rear ends of the clips 23 are pushed through the openings of the spar and welded to parts disposed therebehind.

On each side of each pair of spar openings angular spar strut members 25, which extend entirely across the spar web on the side opposite that to which the spar chords are disposed, are welded to the web 20 and spar chords 21. The rearwardly extending flanges 25a of the spar strut members are parallel with each other. The marginal edges of the struts 25 may be turned as at 25b for strength. To the inner sides of the spar strut flanges 25a at each spar opening there are welded gusset plates 27 which are integral with a connecting web 27a. The parallel plates and connecting web together may be designated as a gusset member. The web 27a of the gusset member is located near the ends of the spar struts 25 and passes closely beneath the inturned edge of the outer flange of the spar chord. The gusset plates 27 are mitered at their rear ends to fit the mitered ends of the connecting shear transfer members 23 and are provided along the mitered edges with out-turned flanges 27b.

There are thus provided three sub-assembly units, namely: (1) the nose section unit, including the nose ribs 14, metallic skin 11 which together with the stringers 11a forms the skin blanket, and connecting shear transfer members 23; (2) the spar unit, including the web 20, chords 21, struts 25, and gusset members 27; and (3) the trailing section unit, including the rib chords 16a, struts 16b, 16c, 16d, and the rear marginal connecting members 17 and 18, the fabric skin 12 not being placed until after final assembly of the metal frame elements. The nose section unit is secured to the spar unit, and thereafter the trailing section unit is secured to this assemblage.

The trailing rib chords 16a are channel-shaped and of a width to nest over the outside of the gusset units 27. The box-section forward inclined struts 16d of the trailing ribs are of a width to nest within the sides of the connecting shear transfer members 23 between the mitered end edges 23c. They are welded thereto and therethrough to the gusset plates 27. Their ends are mitered to fit against the bottom webs of the connecting shear transfer members 23. The trailing rib chords 16a are welded to the gusset plates 27 within their connecting webs, the connecting web 27a of the gusset member fitting against or near the interiorly raised ridge of the rib chord.

It will be noted that the connecting shear transfer members 23 are both located on the same side for each nose rib. They are slightly out of alignment transversely because the nose rib elements 14a to which they are welded are secured together in overlapping relationship; but since the thickness of the rib elements is very small and since their rear ends at the spaced-apart inner edges are spaced forward of the spar, it is easy to push the connecting members 23 sidewise sufficiently to make the assembly connection.

If desired for greater lightness, the gusset members may be provided on the front sides with integral side plates which at each spar opening take the place of the spar struts 25; however, the struts are preferred where greater rigidity is desired and the added weight can be accommodated.

There is thus provided a construction in which the major portion of the shear loads existing in the nose section in use are transferred directly from the ribs to the shear transfer members 23, which in addition to being connected in shear thereto, are connected in shear to the spar through the struts 25, thus eliminating, in the absence of these members, weaker tension connections with the spar chords, and minimizing stresses at the connections of the metallic skin with the spar chords.

The advantages of this construction will be apparent from the above description. It provides great strength for its weight, makes inspection easy, and provides particular advantages in forming the sub-assemblies and putting them together. The nose section may be formed in open position in suitable half-section jigs and then folded together and the overlapping portions of the rib elements welded together. Instead of using a single skin sheet for the nose section, as shown, there may be a sheet for each half section, the sheets being secured together at the nose when the half-shells are brought together.

Airfoils of the described type tend to fulcrum at one side and rupture at the connection on the other side. The double interior shear transfer connection furnishes great resistance against this tendency to rupture and insures that the airfoil will safely withstand the stresses to which it is subjected through the transfer of shear loads by these members.

While one embodiment of the invention has been specifically described for purposes of illustration, it is to be understood that the invention may have various embodiments within the limits of the prior art and the scope of the subjoined claims.

What is claimed is:

1. An airfoil comprising in combination; a nose section sub-assembly unit including a rib comprising half-rib plate elements welded through peripheral flanges to a skin blanket and welded together at their front ends through overlapping interior projections, and a box-like shear transfer member open at one side and cut back from the ends welded to the rear inner edge of each rib element at its front end and projecting rearwardly at its rear end; a spar section sub-assembly unit including a plate web having openings for said box-like members, L-shaped chords welded to the outer edges of the web, L-shaped struts welded to the web on each side of the openings with a side of each strut parallel to the side of the other strut, and a U-shaped gusset member welded to said struts at each opening with the backing web of the gusset member disposed outwardly toward said spar chords; and a trailing section sub-assembly including a truss rib comprising chords and struts, one strut at the front end being inclined, said chords each being welded to a gusset member exteriorly, and said inclined strut being welded inside the rear end of one of said box-like members which is welded inside one of said gusset members.

2. An airfoil comprising, in combination, a main spar having trailing and leading sides and a plurality of spaced pairs of angle members secured to the trailing side thereof, each pair of angle members extending transversely of said spar and being spaced apart; a nose section at the leading side of said spar and having a metallic skin secured at its trailing edges to said spar and internal ribs secured to said skin, said ribs having substantially the same spacing as the spacing of said pairs of angle members; means for transferring to said spar shear loads existing in said nose section during use of the airfoil, said means including at least one channel-shaped member for each of said ribs and extending through said spar and between a pair of angle members, said channel member being secured through one side thereof to said rib and through both sides thereof to said pair of angle members; and a trailing section secured to said spar at the trailing side thereof.

3. An airfoil as set forth in claim 2 in which the securement of the sides of the channel members to the nose rib and the angle members is in shear.

4. An airfoil as set forth in claim 2, further including a U-shaped gusset member nested within the angle members and receiving the channel member.

5. An airfoil as set forth in claim 2, further characterized by the fact that a U-shaped gusset member is secured to said spar, said channel-shaped member being nested within and secured to said gusset member and rib elements of said trailing section being nested with and secured to said gusset member.

6. A structural assembly, as for airfoils, comprising in combination, a first section, a second section, and a spar connected at its outer edges to the sides of the first section, said first section and second section having aligned ribs disposed transversely of the plane of the spar, the ribs of the second section comprising spaced chords, said spar having an interior opening in the line of each set of aligned ribs, spaced shear transfer elements secured to a rib of the first section on each side of the longitudinal center of the rib and projecting through one of said spar openings, transverse spar struts on each side of the opening and said shear transfer elements, and a gusset member at each side of the second section connecting together the spar struts on each side of the opening and connecting the struts to the shear transfer elements and to the rib chords of the second section.

7. A structural assembly, as for airfoils, comprising in combination, a first section, a second section, and a spar connected at its outer edges to the sides of the first section, said first section and second section having aligned ribs disposed transversely of the plane of the spar, the ribs of the second section comprising spaced chords, the first-section ribs being bipartite and joined at their front ends, said spar having an interior opening in the line of each set of aligned ribs, shear transfer members secured to the inner longitudinal edges of the first-section ribs on each side of the longitudinal center of the rib and projecting through the opening in said spar, and means behind the spar securing together the parts of said spar on each side of the opening and connecting the spar to the shear transfer members and to the rib chords of the second section.

8. A structural assembly, as for airfoils, comprising in combination, a leading section, a trailing section, and a spar connected between said sections, a bipartite rib in the leading section disposed transversely of the plane of the spar, said rib including mating plate elements which are secured together at the front end and which stand clear of each other and the spar at the rear end, said spar having an interior opening in the line of a rib, a rigid chordwise extending member secured to the free inner edge of each rib plate and projecting through the opening in the spar, and means on the rear side of the spar extending across the opening in the spar alongside said chordwise extending member and securing it to the spar.

MICHAEL WATTER.